United States Patent [19]

Shimoda et al.

[11] 3,842,282
[45] Oct. 15, 1974

[54] CASSETTE FOR X-RAY PHOTOGRAPHY

[75] Inventors: Noboru Shimoda; Sadaaki Koba, both of Kanagawa, Japan

[73] Assignee: Fuji Photo Film Co., Ltd., Kanagawa, Japan

[22] Filed: Apr. 19, 1973

[21] Appl. No.: 352,830

[30] Foreign Application Priority Data
Apr. 19, 1972  Japan.............................. 47-39469

[52] U.S. Cl............................. 250/468, 250/481
[51] Int. Cl. .......................................... G01n 21/34
[58] Field of Search .......... 250/468, 469, 470, 471, 250/480, 481; 221/126, 129; 312/35, 42

[56] References Cited
UNITED STATES PATENTS

| | | | |
|---|---|---|---|
| 2,536,499 | 1/1951 | Godenne............................. | 250/468 |
| 2,925,766 | 2/1960 | Sandgren............................. | 250/480 |
| 3,001,071 | 9/1961 | Reiss................................... | 250/481 |
| 3,105,903 | 10/1963 | Sano.................................. | 250/468 |
| 3,111,585 | 11/1963 | Sano.................................. | 250/468 |
| 3,499,147 | 3/1970 | Goodman........................... | 250/481 |
| 3,509,340 | 4/1970 | Wood.................................. | 250/468 |
| 3,628,840 | 12/1971 | Wenthe............................... | 250/468 |
| 3,631,243 | 12/1971 | Byler................................... | 250/481 |
| 3,634,687 | 1/1972 | Somerset............................ | 250/468 |
| 3,652,853 | 3/1972 | Williner............................. | 250/468 |

*Primary Examiner*—James W. Lawrence
*Assistant Examiner*—D. C. Nelms
*Attorney, Agent, or Firm*—Sughrue, Rothwell, Mion, Zinn & Macpeak

[57] ABSTRACT

A cassette for X-ray photography comprising a frame having holes or notches at the front edge and having latch grooves at both sides of said holes or notches and a hinged cover in which biased latch members having a latch-releasing member in the center are provided, said latch-releasing member being so arranged that it fits into said hole or notch and said latch members being so arranged that they fit into said latch grooves, said hole or notch being adapted to receive a projection exterior of said cassette which can enter the hole or notch and release the latch members, thereby permitting removal of film in said cassette.

3 Claims, 5 Drawing Figures

CASSETTE FOR X-RAY PHOTOGRAPHY

BACKGROUND OF THE INVENTION

1. Field of the Invention

This invention relates to a cassette for X-ray photography wherein a cover is opened by inserting the cassette into an automatic developing machine or the like, the cover being latched only by pushing the cover.

2. Description of the Prior Art

While various kinds of cassettes in which the cover is opened with the setting of the cassette have hitherto been developed, they involve complicated mechanisms or show poor reliability in handling.

On the other hand, in cassettes in which the cover can be latched only by pushing the cover after charging film thereinto, the cover is not opened upon the setting or inserting operation of the cassette to an automatic developing machine or the like.

SUMMARY OF THE INVENTION

According to this invention, a cassette is provided which has high reliability and durability and in which the cover is latched merely by pushing the cover and which can be opened by setting or inserting the cassette into an automatic developing machine or the like. This invention will be illustrated by an example with reference to drawings.

The numbers in all drawings show the same or corresponding elements, respectively: 1: cassette body, 2: cover, 3: hinge, 4: top portion of cover, 5: latch member, 6: latch-releasing member, 7: spring, 8: top portion of latch member, 9: front edge, 10: latch groove, 11: guide hole, 12: cover-opening projection, 13: guide notch 14: plate spring; 8A and 10A: wedge surfaces.

DETAILED DESCRIPTION OF THE INVENTION

Figure 1:
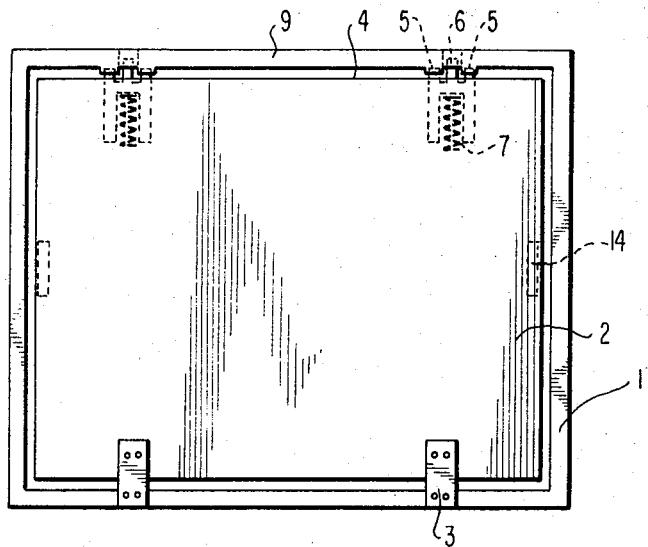
FIG. 1 is a plan view of one embodiment of a cassette according to this invention from the bottom side.
Figure 2:
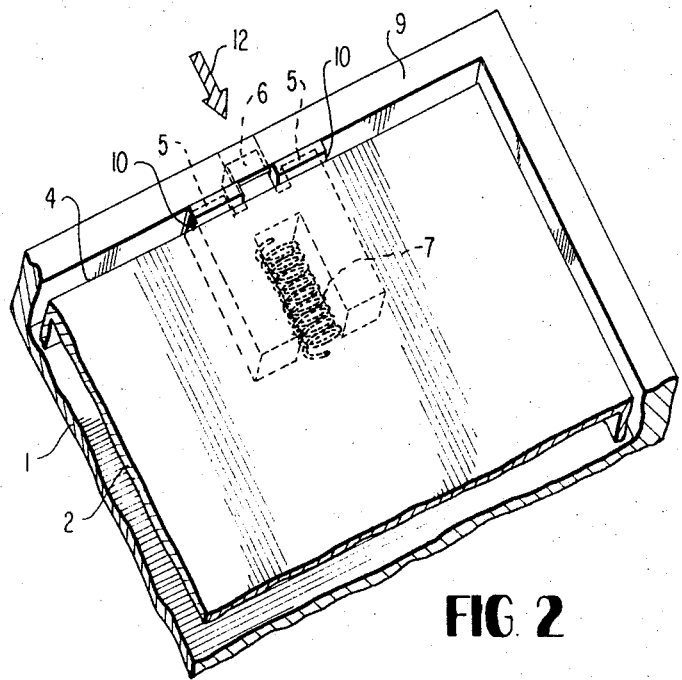
FIG. 2 is a perspective view of the latch portion from the bottom side.
Figure 3:
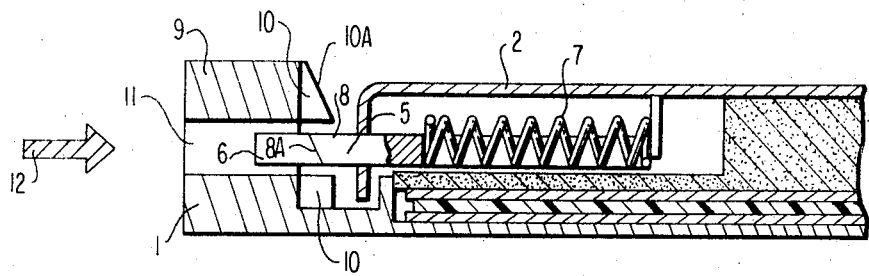
FIG. 3 is a side section view of the same portion.

FIGS. 1 – 3 show views of a cassette according to this invention from the side of cover 2. Referring initially to FIGS. 1, 2 and 3, where like numerals identify like elements, cover 2 is hinged to the body 1 by means of hinges 3. Latch members 5, 5 and a latch-releasing member 6, which are unitary and urged towards the front edge 9 by means of a spring 7, are provided slidably in the top 4 of cover 2.

Latch members 5, 5 are positioned on both sides of the latch-releasing member 6. The top ends 8 of latch members 5, 5 go into the latch grooves 10, 10, which are formed on the inside of the front edge 9 of the cassette body 1. The front edge 9 of the cassette body 1 has a guide hole 11, into which a cover-opening projection 12 provided on an automatic developing machine in a complementary position is inserted. The guide hole 11 is positioned in the middle of the latch grooves 10, 10, so that the top of the latch-releasing member 6 can be introduced into the hole.

When a film is placed in the cassette formed as mentioned above and the cover 2 is pushed to close it, the tops 8 of the latch members 5, 5, which tops are in the form of a wedge, are pushed back by a wedging action as they contact a wedge-shaped upper lip above the latch grooves 10, 10. After the cover 2 has passed by the wedge-shaped upper lip, the latch members 5, 5 enter into the latch grooves 10, 10, whereby the cover 2 is hooked in the body 1. This action is best seen in FIG. 3 where the wedge surface of a top 8 is identified as 8A, and the upper lip portion of a latch groove 10, also shown wedge-shaped to complement surface 8A, is identified by numeral 10A.

When the latch members 5, 5 are pushed back, the latch-releasing member 6 is also pushed back, and, when the latch members 5, 5 enter the latch grooves 10, 10, the latch-releasing member 6 enters the guide hole 11. This state is shown in FIG. 3.

When the cassette is charged into an automatic developing machine or the like, a cover-opening projection 12 provided at an appropriate position in the automatic developing machine is inserted into guide hole 11 while the cover 2 is directed downward. The cover-opening projection 12 goes into the guide hole 11 and pushes against the top of the latch-releasing member 6 against the force of the spring 7 to push latch members 5, 5 backwards, whereby the tops of the latch members 5, 5 are released from the latch grooves 10, 10 and the cover 2 opens downward under its own weight. Thus, the X-ray film falls into the machine.

Figure 5:
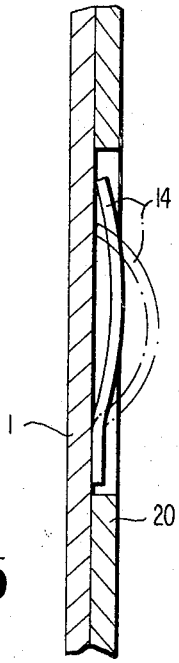
FIG. 5 shows a schematic of film releasing means.

In order to make the fall of the film easy, a plate spring 14 for releasing the film may be provided at the side of the body 1 as shown by dotted lines. This feature is very valuable because it was very difficult to remove a film from prior art cassettes because of adhesion of the film to sensitizing paper in the cassette. As shown in FIG. 1, however, the provision of a spring or the like, which separates the film from the sensitizing paper, on the cassette body 1 and the cover 2 ensures the separation of the film. For instance, the spring could be attached to the body of the cassette, and be depressed by the film upon insertion. Then, when the cover is opened the restraining force of the cover is removed and the spring, permitted to return to the relaxed position, urges the film from the cassette and sensitizing paper. See, e.g., FIG. 5, where spring 14 is shown on body 1 with sensitizing paper 20 still in place without the film. The solid lines represent the spring position when the cover is closed and the dotted lines when the cover is open.

As described above, the provision of the guide hole 11 and the latch-releasing member 6 in the form of a projection which is inserted into the guide hole 11 gives a cover-latching effect caused by the guide hole 11 and the latch-releasing member 6 in addition to the cover-latching effect provided by the latch members 5, 5 and the latch grooves 10, 10, resulting in a further enhancement in the reliability of cover latching.

Figure 4:
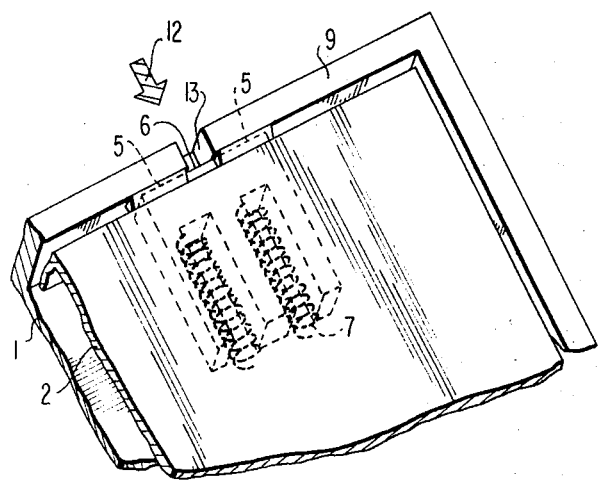
FIG. 4 is a perspective view of the latch portion of another embodiment of a cassette from the bottom side.

FIG. 4 shownus another embodiment of the invention, in which the latch releasing member 6 and latch members 5, 5, which are placed at both sides of the latch-releasing member 6, are arranged in a plane, the portion of front edge 9 opposing the latch members 5, 5 is provided with a latch groove 10 and the portion opposing the latch-releasing member 6 is provided with a guide notch 13 instead of a guide hole 11. Speaking broadly, the cover-opening projection 12 can be introduced through any kind of a suitable opening, whether specifically denominated as a hole or a notch.

According to this example, the latch member and the latch-releasing member can be manufactured very easily.

The wedge portion, which is formed at the top of the latch member in such manner that the member can enter in the latch groove when the cover is closed, can be provided at the upper portion of the latch groove of the front edge of the body to attain the same purpose. As shown in FIG. 3, when the cover 2 of cassette is closed, the latch members 5, 5 go into the latch grooves 10, 10 and latch the cover. In this case, the top ends 8 of latch members 5, 5 as well as the latch grooves 10, 10 form inclined surfaces 8A and 10A respectively, so that, on pushing the cover 2, the latch members 5, 5 can slide on the inclined surface 10A in the latch groove while resisting the force of the spring 7. Thus, after fully pushing the cover down, the spring 7 returns and the cover 2 is fixed to the cassette body 1.

According to this invention, as described above, the provision of a latch-releasing member at the center of both latch members gives increased reliability in latching the cover and good directional stability in pushing the latch-releasing member by means of the cover-opening projection.

While the top of a latch member in such a mechanism of the prior art where the cover is pushed and then hooked is readily worn, one according to this invention has increased durability.

While the invention has been described in detail and with reference to specific embodiments thereof, it will be apparent to one skilled in the art that various changes and modifications can be made therein without departing from the spirit and scope thereof.

What is claimed is:

1. In a cassette for X-ray photography comprising:
   1. a body comprising a face and front, rear, and side edges integrally mounted thereon;
   2. a cover hingedly mounted on the rear edge of said body; and
   3. a latching mechanism for latching said cover in closed position on said body, the improvement wherein:
   a. said body has:
      i. a pair of latch grooves on the inside of the front edge;
      ii. a pair of wedge-shaped upper lips on the inside of the front edge, one of said pair of wedge-shaped upper lips being located above each of said pair of latch grooves; and
      iii. a guide opening located between the pairs of latch grooves and wedge-shaped upper lips, said guide opening extending clear through the front edge of said body and
   b. said latching mechanism comprises:
      i. a pair of latch members movably mounted on the front edge of said cover, said latch members being positioned so that one will cooperate with one of said pair of latch grooves and the other will cooperate with the other of said pair of latch grooves when said cover is in closed position, said latch members having wedge-shaped front edges shaped to complement said wedge-shaped upper lips;
      ii. a latch releasing member integrally connected to said latch members, said latch releasing member being positioned to cooperate with said guide opening when said cover is in closed position; and
      iii. biasing means urging said pair of latch members and said latch releasing member towards the front of said cover, whereby,
         when said cover is swung shut, said latch members will first be forced towards the rear of said cover against the urging of said biasing means by the contact of the wedge-shaped front edges of said pair of latch members with said pair of wedge-shaped upper lips and will then engage said pair of latch grooves after said latch members have passed said wedge-shaped upper lips and
         said cover may be opened by means of the insertion of an appropriate cover-opening means into said guide opening, forcing said latch releasing member, and thus said pair of latch members as well, towards the rear of said cover against the urging of said biasing means.

2. A cassette as claimed in claim 1 wherein said guide opening is a guide hole and said latch releasing member projects into said guide hole, whereby said latch releasing member takes on a cover-latching function complementary to that of said pair of latch members.

3. A cassette as claimed in claim 1 wherein said guide opening is a guide notch, open to the top of the front edge of said body.

* * * * *